United States Patent [19]

Kondo et al.

[11] 4,315,180
[45] Feb. 9, 1982

[54] HIGH VOLTAGE PIEZOELECTRIC GENERATING DEVICE WITH LENGTHENED SPARK TIME

[75] Inventors: Kaneichi Kondo, Settsu; Yuji Shingu, Neyagawa, both of Japan

[73] Assignee: Matsushita Electric Industrial Co., Ltd., Osaka, Japan

[21] Appl. No.: 125,709

[22] Filed: Feb. 28, 1980

Related U.S. Application Data

[63] Continuation of Ser. No. 968,516, Dec. 11, 1978, which is a continuation of Ser. No. 801,788, May 31, 1977.

[30] Foreign Application Priority Data

Jun. 10, 1976 [JP] Japan ............................. 51-76172[U]
Sep. 20, 1976 [JP] Japan ............................ 51-127095[U]
Oct. 19, 1976 [JP] Japan ............................ 51-140830[U]

[51] Int. Cl.³ .......................................... H01L 41/08
[52] U.S. Cl. ................................... 310/319; 310/339
[58] Field of Search ............................. 310/319, 339; 315/241 R, 241 P, 209 PZ, 55; 361/260

[56] References Cited

U.S. PATENT DOCUMENTS

| | | | |
|---|---|---|---|
| 3,486,075 | 12/1969 | Steinke et al. ................ | 310/339 X |
| 3,541,360 | 11/1970 | Tonari ............................. | 310/339 |
| 3,585,417 | 6/1971 | Helfen ............................ | 310/339 X |
| 3,748,502 | 7/1973 | Bernstein ....................... | 310/319 |
| 3,866,069 | 2/1975 | Ishii et al. ...................... | 310/339 |
| 4,025,817 | 5/1977 | Wollschleger ................. | 310/339 X |

FOREIGN PATENT DOCUMENTS

| | | | |
|---|---|---|---|
| 1386718 | 12/1964 | France ............................ | 310/339 |
| 963986 | 12/1965 | France ........................... | 310/339 |
| 1076275 | 7/1967 | United Kingdom ........... | 310/339 |
| 1218207 | 1/1971 | United Kingdom ........... | 310/339 |

*Primary Examiner*—Mark O. Budd
*Attorney, Agent, or Firm*—Stevens, Davis, Miller & Mosher

[57] ABSTRACT

A high voltage generating device in which a piezo-electric element is struck by a hammer to cause arc between discharging electrodes, includes a coil having an inductance of 100 to 1500 mH connected between the piezoelectric element and the discharging electrode to extend the arc period, improve the ignition factor, improve the operability and reduce impact noise.

6 Claims, 13 Drawing Figures

HIGH VOLTAGE PIEZOELECTRIC GENERATING DEVICE WITH LENGTHENED SPARK TIME

This is a continuation of application Ser. No. 968,516 filed Dec. 11, 1978 which in turn is a continuation of application Ser. No. 801,788, filed May 31, 1977.

The present invention relates to a high voltage generating device wherein a piezo-electric element is struck to generate a high voltage for causing arc, and more particularly, to a high voltage generating device suitable for use in a cigarette lighter.

It is an object of the present invention to provide a high voltage generating device which is capable of being ignited with a small actuating force.

A high voltage generating device using a piezo-electric element of this type comprises a hammer for striking the piezo-electric element, and a spring for spring biasing the hammer. The spring is compressed while the hammer is locked and, when the hammer is unlocked, it is moved abruptly by the spring force to strike the piezo-electric element. A high voltage generated across the piezo-electric element is applied to discharging electrodes to cause arc thereacross for igniting a gas.

In a prior art high voltage generating device of the type described above, the piezo-electric element and the discharging electrodes are electrically connected. Therefore, although a high arc current is obtainable, the arc period is short (approximately 20µ seconds) and the ignition factor or efficiency is low.

It has been proposed to insert a resistor C of approximately 10 to 100 kΩ between the piezo-electric element and the dishcarging electrode to extend the arc period. However, even with such resistor, the arc period has been extended to approximately 25µ seconds at most.

The present invention provides a high voltage generating device which overcomes the drawbacks of the prior art devices and which is capable of substantially extending the arc period.

These and other objects, features and advantages of the present invention will be apparent from the following description taken in conjunction with the accompanying drawing, in which.

Figure 1:
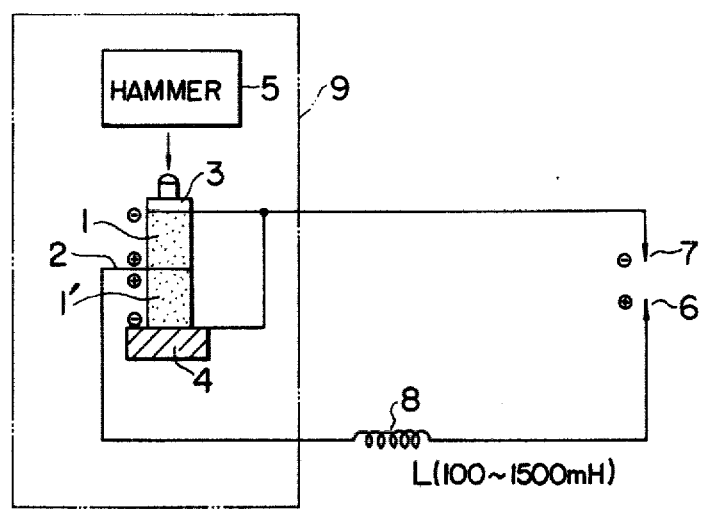
FIG. 1 shows a basic construction of a high voltage generating device of the present invention.

FIG. 1 shows a basic construction of the present invention. In FIG. 1, numerals 1 and 1' denote piezo-electric elements and an intermediate electrode 2 is interposed therebetween. Numeral 3 denotes an abutment disposed on one side of the piezo-electric element 1, and numeral 4 denotes a receptacle disposed on one side of the piezo-electric element 1'. By striking the abutment 3 by a hammer 5, high voltages are generated across the piezo-electric elements 1 and 1' by impact force of the hammer 5. The piezo-electric elements 1 and 1' are electrically connected in parallel with each other and the high voltages generated across the piezo-electric elements 1 and 1' are applied across discharging electrodes 6 and 7 to produce an arc thereacross. Numeral 8 denotes a coil connected between the intermediate electrode 2 and the discharging electrode 6 and it has an inductance L of 100 to 1,500 mH.

Figure 2:
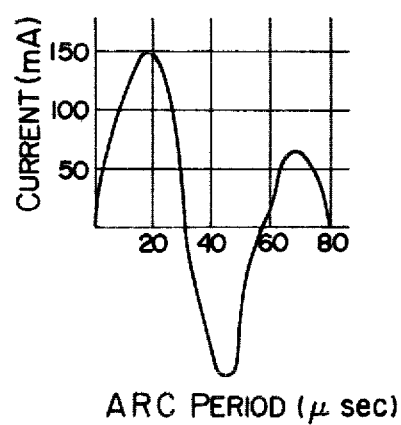
FIG. 2 shows an acr current waveform for the high voltage generating device shown in FIG. 1.

FIG. 2 shows an arc current waveform in the high voltage generating device of the present invention. As seen from FIG. 2, an arc period is approximately 30 µ seconds. 1

Figure 3:
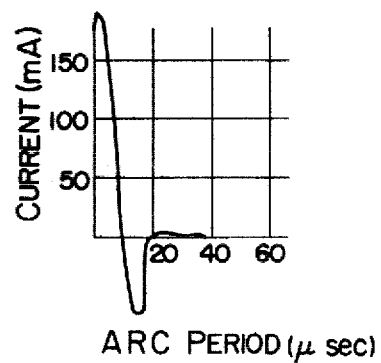
FIG. 3 shows an arc current waveform for a prior art high voltage generating device.

FIG. 3 shows an arc current waveform in a prior art high voltage generating device in which a piezo-electric element unit 9 shown in FIG. 1 is used and a resister (of approximately 10 to 100 kΩ) is connected between the intermediate electrode 2 and the discharging electrode 6. As seen from FIG. 3, the arc period of the prior art device is as short as 20 to 25µ seconds.

In this manner, the arc period can be considerably extended by connecting the coil 8 between the piezo-electric elements and the discharging electrode.

One embodiment of the present invention is explained below in more detail.

Figure 4:
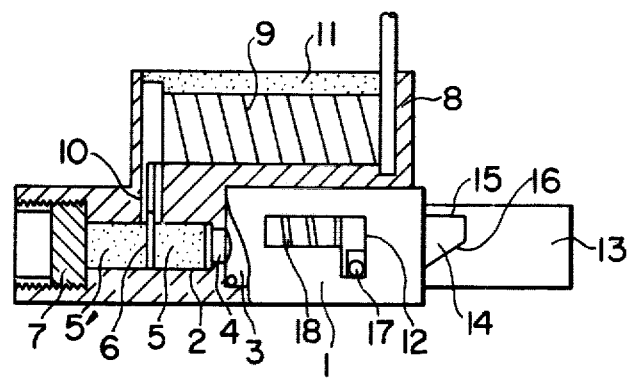
FIGS. 4 and 5 show one embodiment of the present invention.
Figure 5:
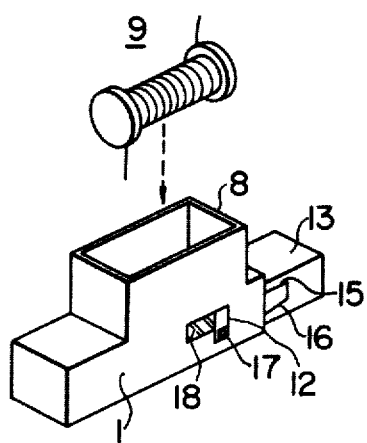

In FIGS. 4 and 5, numeral 1 denotes an outer housing in which a bore 2 and a space 3 are formed. An abutment 4, piezo-electric elements 5 and 5' and an intermediate electrode 6 are housed in the bore 2, and a receptacle 7 is threadedly fitted to an end of the bore 2 to close the bore. Numeral 8 denotes a frame formed integrally on a side (upper side) of the outer housing 1. A coil 9 is housed in the frame 8. One end of the coil 9 extends through a bore 10 and is connected to the intermediate terminal 6. Numeral 11 denotes insulative resin filled in the frame 8. Numeral 12 denotes an L-shaped cam hole formed in a side of the outer housing 1. Numeral 13 denotes an inner housing slidably supported in the space 3 of the outer housing 1. Housed in the inner housing 13 are a hammer 14 and a spring, not shown, for imparting a torsional force and a pushing force to the hammer 14. Numeral 15 denotes a cam hole formed in a side of the inner housing 13, which cam hole 15 is formed with a ramp 16. A pin 17 attached to the hammer 14 extends beyond the cam hole 15. Numeral 18 denotes a spring housed in the space 3 of the outer housing 1. The inner housing 13 is biased outward by the spring force of the spring 18.

In FIG. 4, when the inner housing 13 is pushed against the spring force of the spring 18, the hammer 14 is not moved because the pin 17 is engaged with the cam hole 12 so that the spring (not shown) in the inner housing 13 is compressed to store an energy. As the inner housing 13 is further pushed, the ramp 16 of the inner housing 13 abuts against the pin 17 to pivot the pin 17 so that the pin 17 is disengaged from the cam hole 12. As a result, the hammer 14 abruptly moves leftward by the spring force of the spring (not shown) to strongly strike the abutment 4. By the resulting impact force, high voltages are generated across the piezo-electric elements 5 and 5' and those high voltages are applied across the discharging gap through the coil 9 to create an arc thereacross.

As described above, by applying the high voltages across the discharging gap through the coil 9, the arc period is extended and the ignition factor or coefficient is improved. It has been proved by experiments that a coil 9 having an inductance of 100 to 1,500 mH is optimum to improve the ignition factor.

Figure 6:
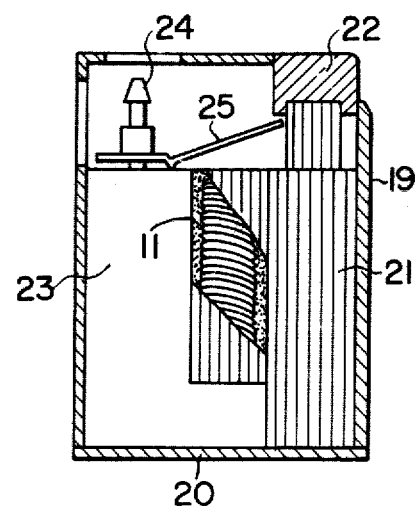
FIG. 6 shows a vertical view of a cigarette lighter incorporating the high voltage generating device shown in FIGS. 4 and 5.

FIG. 6 shows a sectional view of a lighter incorporating the high voltage generating device described above. In FIG. 6, numeral 11 denotes a coil and numeral 19 denotes a casing, and numeral 20 denotes a bottom lid of the casing 19. The high voltage generating device 21 is housed in the casing 19. Numeral 22 denotes an actuating member attached to an end of the inner housing of the high voltage generating device 21, numeral 23 denotes a fuel tank, numeral 24 denotes a gas nozzle, and numeral 25 denotes a nozzle lever which is driven as the actuating member 22 is pushed such that the gas nozzle 24 is driven by the nozzle lever 25 to eject the fuel in the fuel tank 23 from the gas nozzle 24. In this manner, arc is generated as described in connection with the above embodiment to ignite the fuel.

Figure 7:
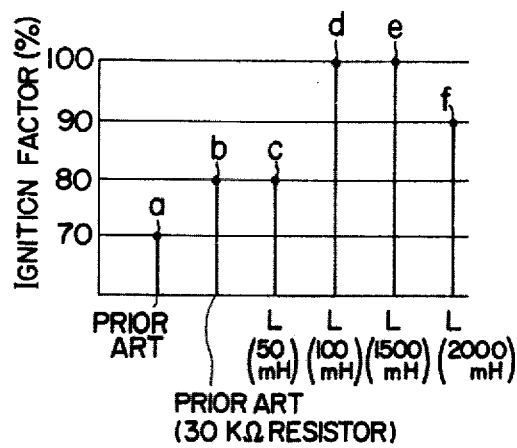
FIG. 7 shows a comparison of ignition factors for prior art device and the present devices.

FIG. 7 show the comparison of the ignition factors for a prior art high voltage generating device (a) in which the piezo-electric element and the discharging electrodes are directly connected, a prior art device (b) in which a resistor of 30 kΩ is connected between the piezo-electric elements and the discharging electrodes, and the high voltage generating devices (c), (d), (e) and (f) of the present invention in whcih the coils of 50 mH, 100 mH, 1,500 mH and 2,000 mH, respectively, are connected. It is seen from FIG. 7 that the ignition factor is particularly improved when the coil having an inductance between 100 mH and 1,500 mH is connected.

Figure 8:
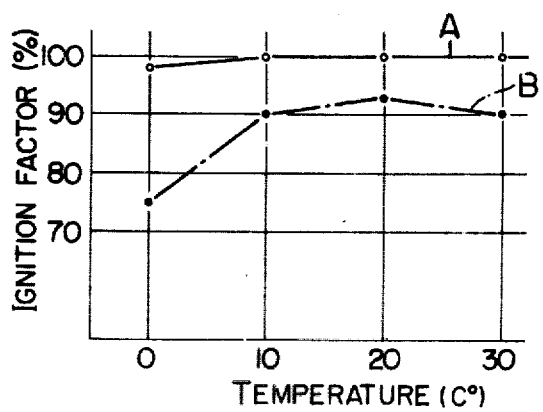
FIG. 8 shows a comparison of ignition factors or coefficients for a prior art cigarette lighter and a lighter incorporating the present invention.

FIG. 8 shows the comparison of the ignition factors relative to surrounding temperature for the lighter A shown in FIG. 6 and a prior art lighter R in which a resistor (30 kΩ) is connected to the output terminal. It is seen from FIG. 8 that the lighter having the coil in accordance with the present invention shows an improved ignition factor over the prior art lighter.

Figure 9:
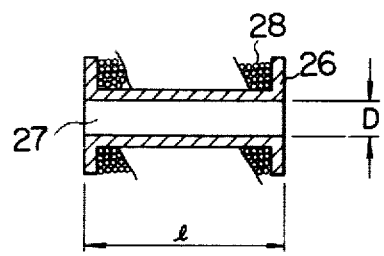
FIG. 9 shows a sectional view of a coil in other embodiment of the present invention.

FIG. 9 shows a sectional view of a coil in other embodiment. In FIG. 9, numeral 26 denotes a bobbin, 27 denotes a core arranged at the center of the bobbin 26, and numeral 28 denotes a coil wound on the bobbin 26. By winding the coil 28 on the center of the bobbin 26, a desired inductance is obtained with a smaller number of turns of the coil and hence the coil may be of small size.

Figure 10:
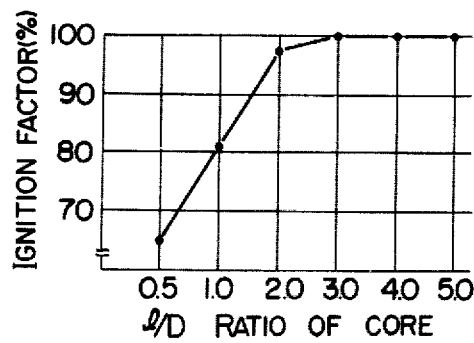
FIG. 10 shows a relation between the ignition factor and a ratio of length to diameter of a core.
Figure 11:
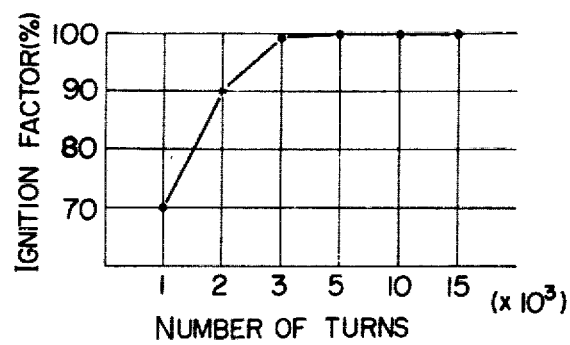
FIG. 11 shows a relation between the ignition factor and the number of turns of the coil.

It has been proved by the experiment that the ignition factor is improved when the length l of the core arranged at the center of the bobbin 26 is longer than two times of the diameter D thereof and the number of turns of the coil 28 is 3,000 turns or more. FIG. 10 shows a relation between the ignition factor and a ratio of the length l to the diameter D of the core 27, and FIG. 11 shows a relation between the ignition factor and the number of turns of the coil 28.

Figure 12:
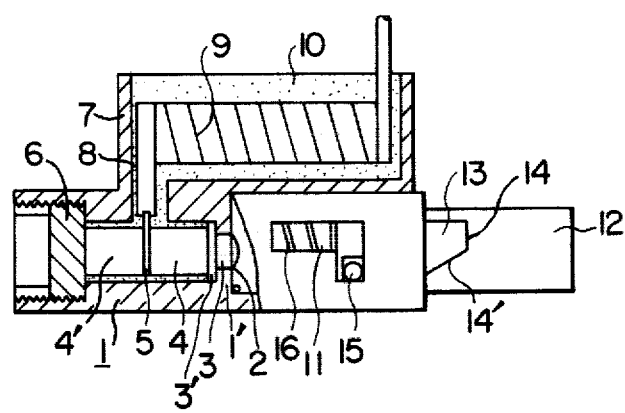
FIG. 12 shows other embodiment of the present invention.

Referring to FIG. 12, other embodiment of the present invention is explained. In FIG. 12, numeral 1 denotes a cylindrical outer housing made of insulative material, and a partition 1' having a bore 2 is integrally formed in the outer housing 1. The outer housing 1 is divided into two sections by the partition 1'. Numeral 3 denotes an abutment having a flange 3'. The abutment 3 is inserted from an opening at an end of the outer housing 1. Numerals 4 and 4' denote piezo-electric elements housed in the outer housing 1. An intermediate electrode 5 is held by the piezo-electric elements 4 and 4'. Numeral 6 denotes an abutment threadedly mounted to the opening of the outer housing 1. The opening of the housing 1 is closed by the abutment 6. Numeral 7 denotes a coil housing integrally formed on a side of the outer housing 1. The housing 7 communicates with a space in the outer housing 1 through a bore 8. Numeral 9 denotes a coil housed in the coil housing 7, and one end of the coil 9 is connected to the intermediate electrode 5 through the bore 8. Numeral 10 denotes insulative resin filled in the coil housing 7. The insulative resin 10 is filled within the coil housing 7 as well as a space between the pizeo-electric elements 4 and 4' and the outer housing 1 through the bore 8. Numeral 11 denotes an L-shaped cam hole and numeral 12 denotes an inner housing slidably supported in the outer housing 1. Supported in the inner housing 12 is a hammer 13 for striking the abutment 3. Numeral 14 denotes a cam hole formed in a side of the inner housing 12. The cam hole 14 is formed with a ramp 14'. Numeral 15 denotes a pin mounted on the hammer 13 and it extends into the cam hole 14 and the L-shaped cam holes 11. Numeral 16 denotes a spring housed in the outer housing 1. The inner housing 12 is biased rightward by the spring force of the spring 16. Housed in the inner housing 12 is a spring, not shown, for biasing the hammer rightward and imparting a torsinal force to the hammer 13.

When the inner housing 12 is pushed leftward from the illustrated position against the spring force of the spring 16, the hammer 16 remains stopped because the pin 15 engages with the L-shaped cam hole 11, and the inner housing 12 is moved leftward. As a result, the spring (not shown) in the inner housing 12 is compressed and an energy is stored therein.

As the inner housing 12 is further pushed leftward, the pin 15 is pivoted by the ramp 14 in the cam hole 14 of the inner housing 12 so that the pin 15 is disengaged from the L-shaped cam hole 11. As a result, the hammer 13 is moved leftward by the spring force of the spring (not shown) in the inner housing 12 and strikes the abutment 3 to cause it to generate a high voltage.

By applying the high voltage through the coil 9 in accordance with the present invention, the arc period is extended and the ignition factor is improved.

As described above, in accordance with the high voltage generating device of the present embodiment, the high voltage is applied through the coil to improve the ignition factor and the coil housing is integrally formed with the side of the outer housing in which the piezo-electric elements are housed and the coil housing is communicated with the outer housing through the bore. Therefore, the resin can be uniformly charged and the insulation for the piezo-electric elements and the insulation for the coil for preventing high voltage breakdown thereof are attained simultaneously. Accordingly, the number of steps of assembly and the cost of material can be reduced.

Figure 13:
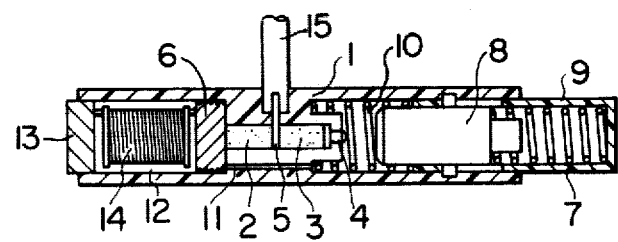
FIG. 13 shows a further embodiment of the present invention.

FIG. 13 shows an internal structure of a high voltage generating device in accordance with a further embodiment of the present invention. In FIG. 13, numeral 1 denotes an outer housing which houses piezo-electric elements 2 and 3 near the center thereof. An abutment 4 to be impacted is mounted at one end of the assembly of the piezo-electric elements 2 and 3, an intermediate electrode 5 is interposed between the piezo-electric elements 2 and 3, and a receptacle 6 is fixed at the other end of the assembly. The abutment 4 and the receptacle 6 are negative electrodes while the intermediate electrode 5 a positive electrode. An inner actuating member 9 made of resin including an impacting spring 7 and a hammer 8 forming an impacting mechanism for impacting the abutment 4 is slidably mounted at an end of an opening formed in the housing 1, against a spring force of a restoring spring 10. The restoring spring 10 is electrically connected to the receptacle 6 by a connecting member 11. This serves to connect the negative electrode to the receptacle 6 through the abutment 4, the hammer 8, the restoring spring 10 and the connecting member 11 when the hammer 8 strikes the abutments 4 to produce a high voltage. Numeral 12 denotes a space defined by extending wall of the outer housing 1 facing the piezo-electric elements 2 and 3. Housed in the space 12 is a coil 14 having one end thereof connected to the receptacle 6 and the other end thereof connected to an external terminal 13, which closes the opening of the space 12. The external terminal 13 is made of carbon doped conductive rubber. Numeral 15 denotes a high voltage lead connected to the intermediate electrode 5.

In the high voltage generating device thus constructed, when the piezo-electric elements 2 and 3 are impacted by the impacting mechanism, a high voltage is generated between the high voltage lead 15 and the external terminal 13. Since the coil 14 is electrically connected between the piezo-electric elements 2 and 3 and the external terminal 13, the duration of high voltage generation can be extended and higher discharging energy is stored.

As described above, in the high voltage generating device of the present embodiment, the piezo-electric elements 2 and 3 and the impacting mechanism for impacting the piezo-electric elements 2 and 3 are arranged coaxially in the outer housing 1, the wall of the outer housing 1 facing the piezo-electric elements 2 and 3 are extending to define the space 12 and the coil 14 electrically connected between the piezo-electric elements 2 and 3 and the external terminal 13 is arranged in the space 12. As a result, higher discharge energy is obtained, and an elongated and compact appearance of the product is obtained without substantial redesign. When the present device is used in a small size gas ignition apparatus such as a cigarette lighter, the size and shape thereof are comparable with a cigarette lighter incorporating a high voltage generating device having no coil. Furthermore, since the external terminal 13 which closes the opening of the space 12 is made of the carbon doped conductive rubber, impact noise which is created when the piezo-electric elements 2 and 3 are impacted is effectively reduced.

The high voltage generating device in accordance with the present invention offers the following advantages.

(1) Since the coil having the inductance of 100 to 1,500 mH is connected in the discharging circuit, the arc period can be extended and the ignition factor is improved.

(2) When the arc period is set to 40 to 50μ seconds, substantially the same ignition factor as is obtainable by a prior art device is attained even when the force for striking the abutment by the hammer is weak. Thus, the actuating force for actuating the inner housing can be reduced to one third of that required in the prior art device, and hence the operability is improved. The actuating force of approximately 3 kg was required in the prior art device which uses a resistor while the present device requires the actuating force of approximately 1 kg.

(3) Since a smaller actuating force is required, the impact noise created when the abutment is struck by the hammer is smaller.

(4) Since a smaller actuating force is required, the stroke of the inner housing can be shortened, the size of the device reduced and its operability improved.

What is claimed is:

1. A high voltage generating device for a cigarette lighter of the type generating a high voltage discharge across discharge electrodes comprising:
    two piezoelectric elements;
    a hammer mechanism for striking said piezoelectric elements;
    an intermediate electrode provided between said two piezoelectric elements;
    a pair of discharge electrodes;
    a first circuit path between one end of each of said piezoelectric elements and one of said discharge electrodes;
    a second circuit path between said intermediate electrode and the other of said discharge electrodes;
    a coil having an inductance value between 100 mH and 1,500 mH connected in said second circuit path for applying a high voltage generated by said piezoelectric elements to said discharge electrodes through said coil to provide an extended arc period across said discharge electrode of substantially greater than 25μ seconds;
    an outer housing containing said piezoelectric elements;
    a coil housing joined with one side portion of said outer housing and having an outer side defining an opening opposite to said one side portion and having a bore formed at its joined portion near said intermediate electrode; and,
    an insulative resin filling said opening of said coil housing to cover said coil housed therein, one end of said coil being connected through said bore to said intermediate electrode.

2. A high voltage generating device according to claim 1, wherein said coil is wound around a bobbin which has a core centrally disposed therein.

3. A high voltage generating device according to claim 1, wherein part of said insulative resin fills ambient space of said piezoelectric elements through said bore.

4. A high voltage cigarette lighter generating device for generating a high voltage spark discharge by striking a piezoelectric element with a hammer comprising a coil having an inductance of between 100 mH and 1,500 mH connected in series with said piezoelectric element to apply the high voltage generated by said piezoelectric element to discharging electrodes through said coil to provide an extended arc period across said discharge electrodes of substantially greater than 25μ seconds, an outer housing containing said piezoelectric element, said coil being housed in an extended portion of an end of said outer housing, a first conductor disc for interconnecting one end of said coil and said piezoelectric element and a second conductor disc connected with the second end of said coil, said second conductor disc forming an end closure of said outer housing.

5. A high voltage generating device according to claim 4 wherein said second conductor disc is a carbon doped conductive rubber, which is adapted to contact with said second end of said coil.

6. A high voltage generating device according to claim 4, wherein said coil is wound around a bobbin which has a core centrally disposed therein.

* * * * *